US008847570B1

(12) United States Patent
Bell

(10) Patent No.: US 8,847,570 B1
(45) Date of Patent: Sep. 30, 2014

(54) LINE DROP COMPENSATION METHODS AND SYSTEMS

(71) Applicant: Utilidata, Inc., Providence, RI (US)

(72) Inventor: David Bell, Spokane, WA (US)

(73) Assignee: Utilidata, Inc., Providence, RI (US)

( * ) Notice: Subject to any disclaimer, the term of this patent is extended or adjusted under 35 U.S.C. 154(b) by 0 days.

(21) Appl. No.: 14/264,973

(22) Filed: Apr. 29, 2014

Related U.S. Application Data

(60) Provisional application No. 61/817,643, filed on Apr. 30, 2013.

(51) Int. Cl.

| | |
|---|---|
| ***G05F 5/00*** | (2006.01) |
| ***G05D 3/12*** | (2006.01) |
| ***G05F 1/10*** | (2006.01) |

(52) U.S. Cl.
CPC .......... *G05F 1/10* (2013.01)
USPC .......... 323/301; 700/298

(58) Field of Classification Search
USPC .......... 323/300, 301; 700/292–294, 297, 298
See application file for complete search history.

(56) References Cited

U.S. PATENT DOCUMENTS

| | | | | |
|---|---|---|---|---|
| 5,117,174 | A * | 5/1992 | Kessler | 322/21 |
| 5,136,233 | A * | 8/1992 | Klinkenberg et al. | 323/343 |
| 5,210,443 | A * | 5/1993 | Kugler | 307/17 |
| 5,466,973 | A * | 11/1995 | Griffioen | 307/17 |
| 5,530,338 | A * | 6/1996 | Beckwith | 323/255 |
| 5,541,498 | A * | 7/1996 | Beckwith | 323/211 |
| 5,550,460 | A * | 8/1996 | Bellin et al. | 323/255 |
| 5,581,173 | A * | 12/1996 | Yalla et al. | 323/257 |
| 7,069,117 | B2 * | 6/2006 | Wilson et al. | 700/295 |
| 7,763,994 | B2 * | 7/2010 | Inomoto | 307/75 |
| 8,427,131 | B2 * | 4/2013 | Bryson et al. | 323/343 |
| 8,437,883 | B2 | 5/2013 | Powell et al. | |
| 8,456,142 | B2 * | 6/2013 | Zhu et al. | 323/222 |
| 8,519,681 | B2 * | 8/2013 | Mathewson | 323/257 |
| 8,577,510 | B2 | 11/2013 | Powell et al. | |
| 8,639,389 | B2 * | 1/2014 | Vukojevic et al. | 700/286 |
| 2003/0016001 | A1 * | 1/2003 | Borup | 323/364 |
| 2005/0200459 | A1 * | 9/2005 | White, II | 340/310.01 |
| 2006/0195229 | A1 * | 8/2006 | Bell et al. | 700/286 |
| 2007/0285079 | A1 * | 12/2007 | Nasle | 324/76.22 |
| 2008/0177678 | A1 * | 7/2008 | Di Martini et al. | 705/412 |
| 2009/0187284 | A1 * | 7/2009 | Kreiss et al. | 700/291 |
| 2009/0187579 | A1 * | 7/2009 | Brancaccio et al. | 707/10 |
| 2010/0090674 | A1 * | 4/2010 | Bell | 323/301 |
| 2011/0208371 | A1 * | 8/2011 | Duncan et al. | 700/297 |
| 2012/0022713 | A1 * | 1/2012 | Deaver et al. | 700/298 |

* cited by examiner

*Primary Examiner* — Matthew Nguyen
*Assistant Examiner* — Emily P Pham
(74) *Attorney, Agent, or Firm* — Foley & Lardner LLP; Christopher J. McKenna; Chethan K. Srinivasa

(57) ABSTRACT

This disclosure is directed to regulating electric power at a node of a system for distribution of electricity. A voltage controller can identify properties of branch structures in a system that includes a voltage regulation device that controls a voltage source supplying electricity to nodes via the branch structures. The voltage controller can receive information on voltage and current associated with electricity provided by the voltage source. The voltage controller can receive, from a metering devices at nodes in the system, primary voltage information. The voltage controller can select one of the nodes based on the primary voltage information. The voltage controller can determine, based on the properties, an impedance for a branch structure corresponding to the selected node. The voltage controller can control the voltage regulation device based on the impedance for the branch structure corresponding to the selected node and the information on the voltage and the current.

20 Claims, 9 Drawing Sheets

500

700

900

LINE DROP COMPENSATION METHODS AND SYSTEMS

CROSS-REFERENCE TO RELATED APPLICATIONS

This application claims the benefit of priority under 35 U.S. §119 to U.S. Provisional Patent Application No. 61/817,643, filed Apr. 30, 2013, which is incorporated by reference herein in its entirety.

TECHNICAL FIELD

The disclosed embodiments relate to a method for regulating electric power being supplied to one or more electrical or electronic loads and more particularly to adjusting voltage levels of power provided to the electrical or electronic device(s) based on estimates determined from the electrical or electronic device(s) consumption.

BACKGROUND

A method and apparatus for regulating electric power being supplied to one or more electrical or electronic device(s) is disclosed.

When supplying power, e.g., to electric utility distribution circuits serving residential and commercial consumers of electrical power, several needs compete and must be simultaneously considered in managing electrical power distribution. A first concern has to do with maintaining delivered electrical power voltage levels within predetermined limits. A second concern relates improving overall efficiency of electrical power usage and distribution. A third concern relates to these and other concerns in light of changing electrical loading of the system and variations in the character of the loading so that the voltages do not decrease to such a level that the devices shut down or function improperly.

One way to accommodate changes in electrical loading is to set preset threshold levels at which the voltage level of the distribution system changes. When the system detects a change in the voltage level, a tap change is initiated (on a multiple-tap transformer) resulting in a system voltage change. A drawback of this system is that the tap may change frequently thus increasing the tap mechanism failure rate. Further the system voltage level may drop suddenly so the preset threshold levels must be set sufficiently high to prevent shutdown resulting in system inefficiencies.

SUMMARY

At least one aspect of the present disclosure is directed to a method of regulating electric power at a node of a system for distribution of electricity. In some embodiments, the method can include a voltage controller identifying one or more properties of branch structures in a system that includes a voltage regulation device. The voltage regulation device can control a voltage source that supplies electricity to a nodes via the branch structures. The method can include the voltage controller receiving information on voltage and current associated with electricity provided by the voltage source. The method can include the voltage controller receiving primary voltage information. The voltage controller can receive the primary voltage information from a metering device at each of the plurality of nodes in the system. The method can include the voltage controller selecting a node of the plurality of nodes based on the primary voltage information. The method can include the voltage controller determining an impedance for a branch structure corresponding to the selected node. The voltage controller can determine the impedance based on the one or more properties. The method can include the voltage controller controlling the voltage regulation device based on the impedance for the branch structure corresponding to the selected node and the information on the voltage and the current.

In some embodiments, the method includes determining an effective resistance from the voltage source to the selected node based on the impedance and the information on the voltage and the current. The method can include the voltage controller controlling the voltage regulation device based on the effective resistance. In some embodiments, the method can include determining an effective resistance from the voltage source to the selected node based on the impedance and the information on the voltage and the current. The method can include determining an effective reactance from the voltage source to the selected node based on the effective resistance and the impedance. The method can include the voltage controller controlling the voltage regulation device based on the effective resistance and the effective reactance.

In some embodiments, the method can include determining a difference between a magnitude of a voltage of the voltage source and a primary voltage of the selected node. The method can include determining an effective resistance based on a quotient of the difference and the magnitude of a source current phasor of the voltage source. The method can include the voltage controller controlling the voltage regulation device based on the effective resistance.

In some embodiments, the method can include determining an effective resistance from the voltage source to the selected node based on the impedance and the information on the voltage and the current. The method can include determining an effective reactance from the voltage source to the selected node based on a product of an effective resistance and the impedance. The method can include the voltage controller controlling the voltage regulation device based on the effective resistance and the effective reactance.

In some embodiments, the one or more properties are indicative of at least one of a size of the branch structures, a material of the branch structures, or an arrangement of the branch structures. In some embodiments, the information on voltage and current includes a source current phasor of the voltage source. In some embodiments, the method can include determining a lower bound for each primary voltage of the plurality of nodes. The method can include selecting the node having the lowest primary voltage based on the lower bound.

In some embodiments, the method can include detecting measurements of electricity supplied to each node of the plurality of nodes from the voltage source. The method can include determining deviant voltage levels that the supplied electricity will not drop below as a result of varying electrical consumption at the node, the deviant voltage level being computed based on a confidence level and the detected measurements. The method can include determining a lower bound for each primary voltage of the plurality of nodes based on the determined deviant voltage levels. The method can include selecting the node having the lowest primary voltage based on the lower bound for each primary voltage of the plurality of nodes.

In some embodiments, the method can include detecting measurements of the supplied electricity to each node of the plurality of nodes by compensating for one or more delays in a signal path of the detected measurements. In some embodiments, the method can include detecting measurements of the supplied electricity to each node of the plurality of nodes by processing a voltage time series of the supplied electricity along multiple signal paths to produce a delay compensated smoothed negative peak envelope of the voltage time series.

In some embodiments, the method can include the voltage controller controlling the voltage regulation device by providing line drop compensation.

Another aspect of the present disclosure is directed to a system for regulating electric power at a node of electric power distribution circuitry. The system can include a computing device including at least one processor. The processor can be configured to identify one or more properties of branch structures in electric power distribution circuitry comprising a voltage regulation device that controls a voltage source supplying electricity to a plurality of nodes via the branch structures. The processor can be further configured to receive information on voltage and current associated with electricity provided by the voltage source. The processor can be further configured to receive, from a metering device at each of the plurality of nodes in the system, primary voltage information. The processor can be further configured to select a node of the plurality of nodes based on the primary voltage information. The processor can be further configured to determine, based on the one or more properties, an impedance for a branch structure corresponding to the selected node. The processor can be further configured to control the voltage regulation device based on the impedance for the branch structure corresponding to the selected node and the information on the voltage and the current.

In some embodiments, the processor can be further configured to determine an effective resistance from the voltage source to the selected node based on the impedance and the information on the voltage and the current. The processor can be further configured to control the voltage regulation device based on the effective resistance.

In some embodiments, the processor can be further configured to determine an effective resistance from the voltage source to the selected node based on the impedance and the information on the voltage and the current. The processor can be further configured to determine an effective reactance from the voltage source to the selected node based on the effective resistance and the impedance. The processor can be further configured to control the voltage regulation device based on the effective resistance and the effective reactance.

In some embodiments, the processor can be further configured to determine a difference between a magnitude of a voltage of the voltage source and a primary voltage of the selected node. The processor can be further configured to determine an effective resistance based on a quotient of the difference and the magnitude of a source current phasor of the voltage source. The processor can be further configured to control the voltage regulation device based on the effective resistance.

In some embodiments, the processor can be further configured to determine an effective resistance from the voltage source to the selected node based on the impedance and the information on the voltage and the current. The processor can be further configured to determine an effective reactance from the voltage source to the selected node based on a product of an effective resistance and the impedance. The processor can be further configured to control the voltage regulation device based on the effective resistance and the effective reactance.

In some embodiments, the one or more properties are indicative of at least one of a size of the branch structures, a material of the branch structures, or an arrangement of the branch structures. In some embodiments, the information on voltage and current comprises a source current phasor of the voltage source.

In some embodiments, the processor can be further configured to detect measurements of electricity supplied to each node of the plurality of nodes from the voltage source. The processor can be further configured to determine deviant voltage levels that the supplied electricity will not drop below as a result of varying electrical consumption at the node. The deviant voltage level can be computed based on a confidence level and the detected measurements. The processor can be further configured to determine a lower bound for each primary voltage of the plurality of nodes based on the determined deviant voltage levels. The processor can be further configured to select the node having the lowest primary voltage based on the lower bound for each primary voltage of the plurality of nodes.

Another aspect is directed to a method of detecting measurements to regulate electric power for distribution of electricity. In some embodiments, the method includes continuously detecting measurements of electrical power supplied to one or more electrical devices from a power source. Estimated deviant voltage levels that the supplied electricity will not drop below or exceed as a result of varying electrical consumption by the one or more electrical devices are continuously computed. The deviant voltage levels may be computed based on a predetermined confidence level and specific properties of the effects on measured voltage due to varying consumption computed from the detected measurements. A voltage level output of the electricity supplied to the electrical device may be adjusted based on the computed deviant voltage level. In some embodiments, the deviant voltage levels may be based on measurements obtained from each of the three phases in a three-phase electric power distribution system. A voltage level supplied to the three-phase distribution system may be adjusted by a voltage regulator capable of setting three-phase voltages.

Yet another aspect is directed to a system for detecting measurements to regulate electric power for distribution of electricity. In some embodiments, the system includes an electronic meter, a processor and a voltage regulator device. The electronic meter continuously detects measurements of electricity supplied to one or more electrical devices from a power source. The processor is in communication with the electronic meter to continuously compute estimated deviant voltage levels that the supplied electricity will not drop below or exceed as a result of varying electrical consumption by the electrical device and the detected measurements. The voltage regulator device receives a signal from the processor to adjust a voltage level output of the electricity supplied to the electrical device from the power source based on the computed deviant voltage level.

Another aspect of the present disclosure is directed to a computer readable storage medium comprising instructions for detecting measurements to regulate electric power for distribution of electricity. The instructions when executed by a processor continuously detect measurements of electricity supplied to one or more devices from a power source. The instructions also continuously compute estimated deviant voltage levels that the supplied electricity are not expected to drop below or to exceed with some level of confidence as a result of varying electrical consumption by the one or more electrical devices. In one implementation the deviant voltage level is computed based on a predetermined confidence level and the detected measurements. The instructions also provide a signal to adjust a voltage level output of the electricity supplied to the one or more electrical devices based on the computed estimated deviant voltage level.

Yet another aspect is directed to a method of determining parameter settings for line drop compensation in a circuit comprising a voltage source having a voltage regulation device and a plurality of remote nodes. In some embodiments, the method includes receiving source voltage information indicative of the voltage $\overline{V}_S$ provided by the voltage source; receiving source current information indicative of the source current phasor $\overline{I}_S$ of the voltage source; receiving information indicative of the magnitude of the primary voltage $V_k$ at a plurality of nodes k=1, . . . , n of interest in the circuit; receiving circuit conductor information indicative of the sizes and arrangement of conductors in the circuit; for each $V_k$, estimating lower bound information indicative of an expected lower bound $\hat{V}_k$; based on the lower bound information, determining lowest expected primary voltage information indicative of the node having the lowest expected primary voltage $\hat{V}_L=\min(\hat{V}_k)$; based on the circuit conductor information, estimating circuit branch impedance information indicative of the ratio of $\gamma_L=x_L/r^L$ of reactance to ohmic resistance per unit length for a circuit branch structure corresponding to the node having lowest expected primary voltage $\hat{V}_L$; based on the circuit branch impedance information, determining circuit branch impendence phasor angle information indicative of the phasor angle $\theta_z=\tan^{-1}\gamma_L$; determining effective resistance information indicative of the effective resistance from the source to the node having the lowest expected primary voltage based on the source voltage information, the source current information, and the circuit branch impedance phasor angle information; and determining effective reactance information indicative of the effective reactance from the source to the node having the lowest expected primary voltage based on the effective resistance information and the circuit branch impedance information.

Yet another aspect is directed to a system for determining parameter settings for line drop compensation in a circuit comprising a voltage source having a voltage regulation device and a plurality of remote nodes. The system can include: a processor configured to implement the method of any of the types described herein; and an output for outputting the parameter settings.

Yet another aspect is directed to a non-transitory computer readable storage medium having instructions which when executed by a processor implements the steps of the method of any of the types described herein.

Various embodiments may include any of the above described elements, either alone, or in any suitable combination.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
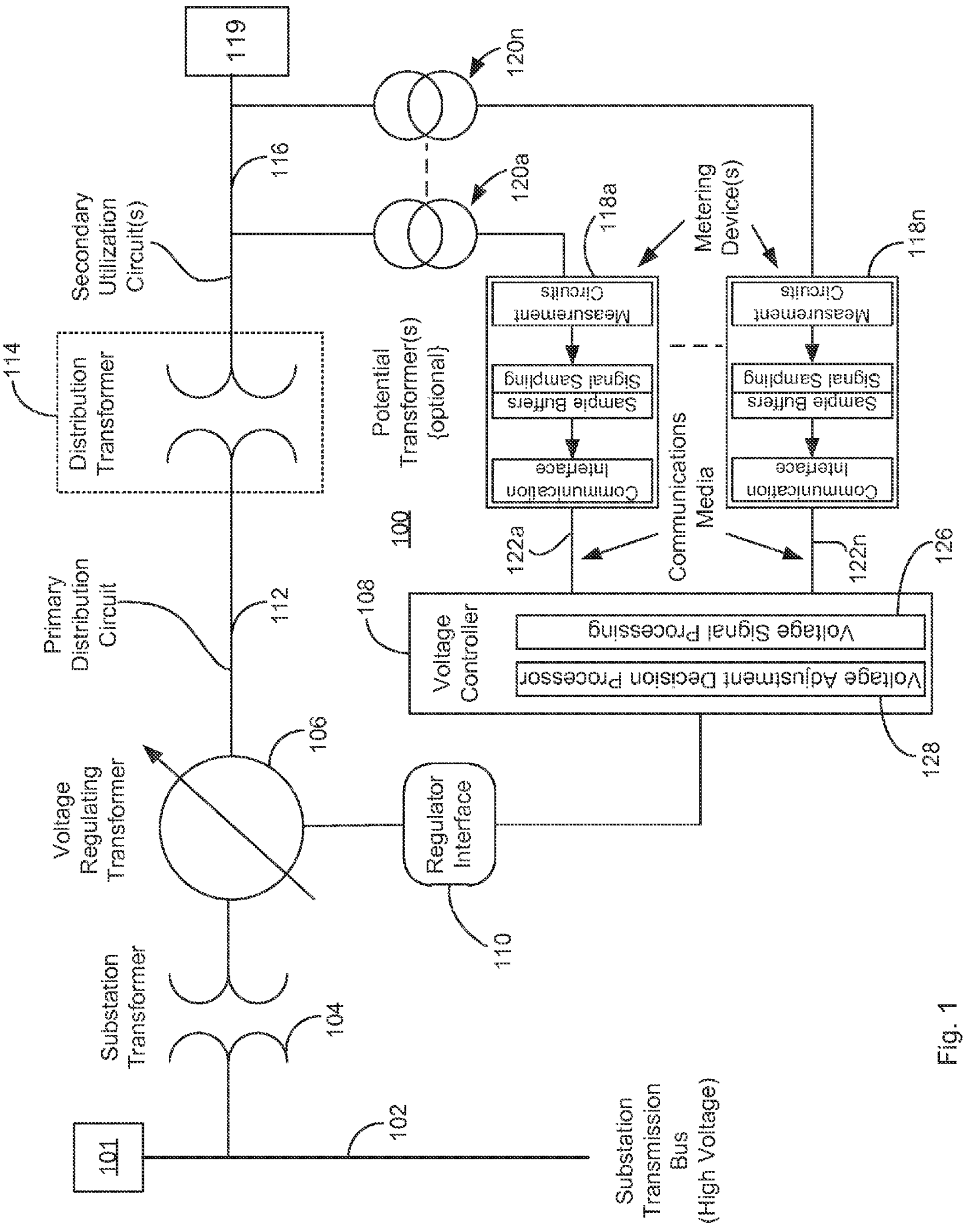
FIG. 1 is an example schematic diagram of a voltage control system for regulating power, in accordance with an embodiment.

Referring to FIG. 1 there is shown a voltage control system 100 having power source 101 connected via a subsystem transmission bus 102 and via substation transformer 104 to a voltage regulating transformer 106. Voltage regulating transformer 106 is controlled by voltage controller 108 with regulator interface 110. Voltage regulating transformer 106 is optionally coupled on primary distribution circuit 112 via optional distribution transformer 114 to secondary utilization circuits 116 and to one or more electrical or electronic devices 119. Voltage regulating transformer 106 has multiple tap outputs (not shown) with each tap output supplying electricity with a different voltage level. The illustrated system described herein may be implemented as either a single-phase or three-phase distribution system.

In an AC Power distribution system and in some embodiments, voltage may refer to a root-mean-square or "RMS Voltage". In some embodiments, voltage may refer to a voltage component at a system fundamental frequency. Thus "voltage" as used in this disclosure may refer to either of the foregoing. The regulating transformer 106 is typically one of two basic types: (1) a multi-tap autotransformer (single or three phase), which are used for distribution; or (2) on-load tap changer (three phase transformer), which is integrated into a substation transformer and used for both transmission and distribution.

Monitoring devices 118*a*-118*n* are coupled through optional potential transformers 120*a*-120*n* to secondary utilization circuits 116. Monitoring devices 118*a*-118*n* continuously detects measurements and continuous voltage signals of electricity supplied to one or more electrical devices 119 connected to circuit 112 or 116 from a power source 101 coupled to bus 102. Monitoring devices 118*a*-118*n* are coupled through communications media 122*a*-122*n* to voltage controller 108.

Voltage controller 108 continuously computes estimated deviant voltage levels that the supplied electricity will not drop below or exceed as a result of varying electrical consumption by the one or more electrical devices. The deviant voltage levels are computed based on a predetermined confidence level and the detected measurements (as explained in more detailed herein). Voltage controller 108 includes a voltage signal processing circuit 126 that receives sampled signals from metering devices 118*a*-118*n*. Metering devices 118*a*-118*n* process and sample the continuous voltage signals such that the sampled voltage signals are uniformly sampled as a time series that are free of spectral aliases. Such metering devices having this process and sample capability are generally commercially available.

Voltage signal processing circuit 126 receives signals via communications media from metering devices 118 processes the signals and feeds them to voltage adjustment decision processor circuit 128. Although the term "circuit" is used in this description, the term is not meant to limit this disclosure to a particular type of hardware or design, and other terms known generally known such as the term "element", "hardware", "device" or "apparatus" could be used synonymously with or in place of term "circuit" and may perform the same function. Adjustment decision processor circuit 128 determines a voltage location with respect to a defined decision boundary and sets the tap position and settings in response to the determined location. More specifically adjustment decision processing circuit 128 in voltage controller 108 computes a deviant voltage level that is used to adjust the voltage level output of electricity supplied to the electrical device. In other words, one of the multiple tap settings of regulating transformer 106 is continuously selected by voltage controller 108 via interface 110 to supply electricity to the one or more electrical devices based on the computed deviant voltage level. Regulator interface 110 may include a processor controlled circuit for selecting one of the multiple tap settings in voltage regulating transformer 106 in response to an indication signal from voltage controller 108.

As the computed deviant voltage level changes other tap settings (or settings) of regulating transformer 106 are selected by voltage controller 108 to change the voltage level of the electricity supplied to the one or more electrical devices.

Figure 2:
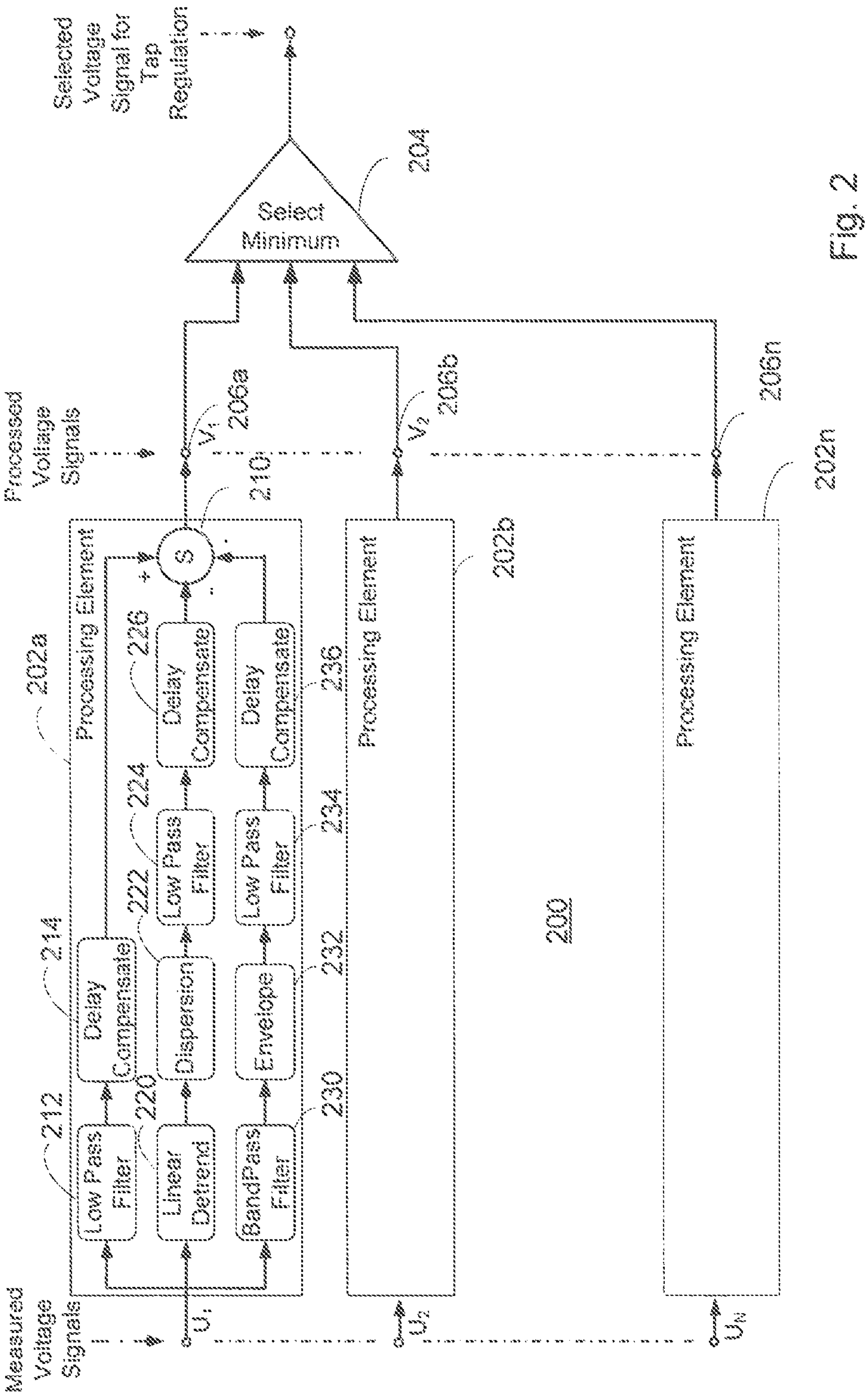
FIG. 2 is an example schematic diagram of a voltage signal processing element shown in FIG. 1 that processes measured voltage signals to provide a selected voltage signal for tap regulation, in accordance with an embodiment.

Referring to FIG. 2, voltage signal processing element 200 is shown having processing elements 202*a*-202*n* coupled to minimum selector circuit 204. Each of the processing elements 202*a*-202*n* receives on their respective input terminals a measured voltage signal from a respective metering device 118*a*-118*n* (FIG. 1). Processing elements 202*a*-202*n* processes the measured signal (as described herein) and generates a processed voltage signal on their output terminals 206*a*-206*n* respectively. Minimum selector circuit 204 selects the processed voltage signal having the minimum voltage and provides the selected signal to the voltage adjustment decision processor circuit 128 for further processing in tap setting regulation.

Processing elements 202*a*-202*n* are identical and thus only one element, 202*a* will be described. Processing element 202*a* includes three parallel processing paths that are coupled to summation circuit 210. Each of the processing elements receives sampled time series signals from metering devices 118*a*-118*n*.

In the first path, a low pass filter circuit 212 receives the measured voltage signal, applies a low pass filter to the signal and feeds the low pass filtered signal to delay compensate circuit 214 where the signal or an estimate of the signal is extrapolated in time such that the delay resulting from the low pass filtering operation is removed and then fed to summation circuit 210. Thus, and in some embodiments, delays in one or more signal paths of detected measurements of supplied electricity (e.g., supplied to nodes of a system for distribution of electricity via branch structures) can be compensated for.

In general, any suitable approach to delay compensation known in the art may be applied to the processed signal. In some embodiments, delay compensation includes the estimation of an all-pole linear predictor, implemented as a convolution of some specified number of samples of the signal of interest with a prediction filter designed using, e.g., the Levinson-Durbin method described in J. Durbin, "The Fitting of Time-Series Models", Review of the International Statistical Institute, Vol. 28, No 3 (1960), pp 233-244 and Musicus, B. R. (1988). "Levinson and Fast Choleski Algorithms for Toeplitz and Almost Toeplitz Matrices." RLE TR No. 538, MIT (available at http://.mit.edu/bitstream/handle/1721.1/4954/RLE-TR-538-20174000.pdf accessed Apr. 29, 2013) the entire contents of which are incorporated herein by reference. In some embodiments, delay compensation includes computing a transform of the filtered signal into a spectral domain (e.g. using a FFT) of the filtered signal, then applying the inverse transform (e.g., using an inverse FFT) with the time variable set extrapolate the signal by a duration equal to the cumulative group delay of the prior filtering steps. In various embodiments of the processing techniques described herein, these procedures could be applied anywhere delay compensation is desired.

Figure 6:
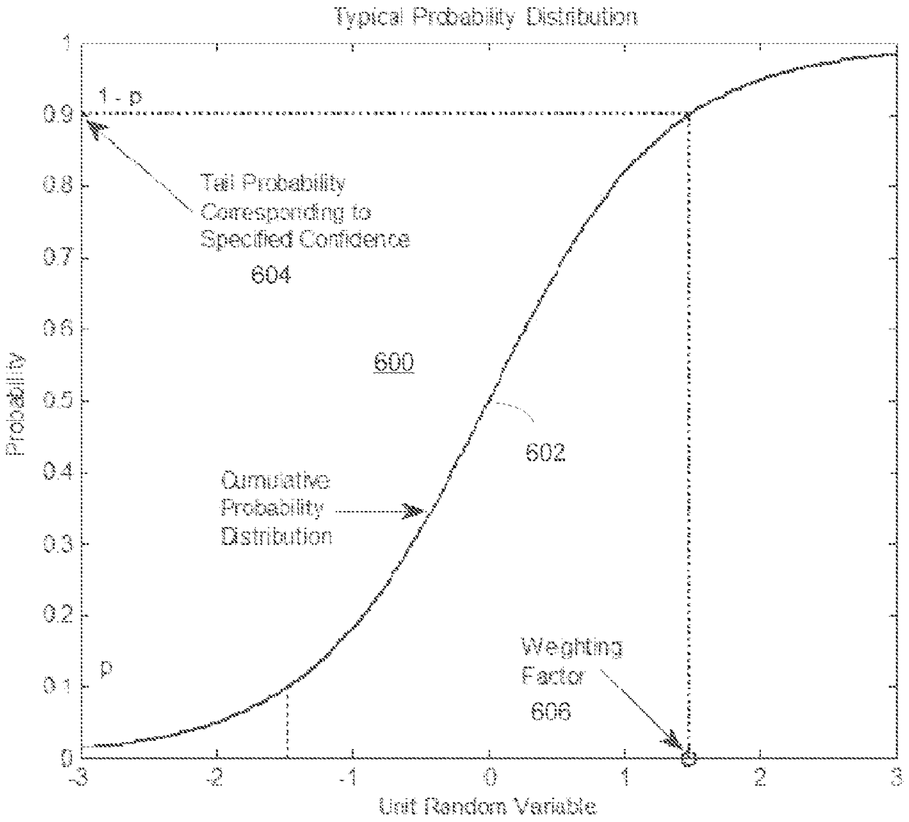
FIG. 6 is an example diagram illustrating a typical probability distribution of the voltage control system that is used to select a weighting factor that is used in estimating voltage deviations, in accordance with an embodiment.

In the second path, a linear detrend circuit 220 receives the measured voltage signal, and removes any linear trends from the signal. The resulting signal, having zero mean and being devoid of any change in its average value over its duration, is then applied to dispersion circuit 222 where a zero mean dispersion is estimated for the signal. The zero mean dispersion estimated signal is fed to low pass filter circuit 224 that applies a low pass filter to the signal. The filtered signal is then fed to delay compensation circuit 226 where the filtered signal or an estimate of the filtered signal is extrapolated in time such that the delay resulting from the low pass filtering operation is removed. A weighting factor 606 is shown in FIG. 6 and is described in connection therewith. Weighting factor 606 is derived from a specified confidence level as described herein and is applied to the signal output from element 226 before being fed as a delay compensated signal to summation circuit 210.

In the third path, a band pass filter circuit 230 receives the measured voltage signal, and applies a band pass filter to the signal. The filtered signal is then applied to an envelope circuit 232 where the signal is formed into a peak envelope with specified peak decay characteristics. The peak envelope signal is fed to low pass filter circuit 234 that applies a low pass filter to the signal to provide a filtered smooth peak envelope voltage signal, and feeds the signal to delay compensation circuit 236 where the filtered smooth peak envelope voltage signal or an estimate thereof is extrapolated in time such that the delay resulting from the low pass filtering operation is removed before being fed to as a delay compensated signal to summation circuit 210. Thus, by processing a voltage time series of the supplied electricity along multiple signal paths, a delay compensated smoothed negative peak envelope of the voltage time series can be produced.

Example Voltage Controller Architecture

Figure 3:
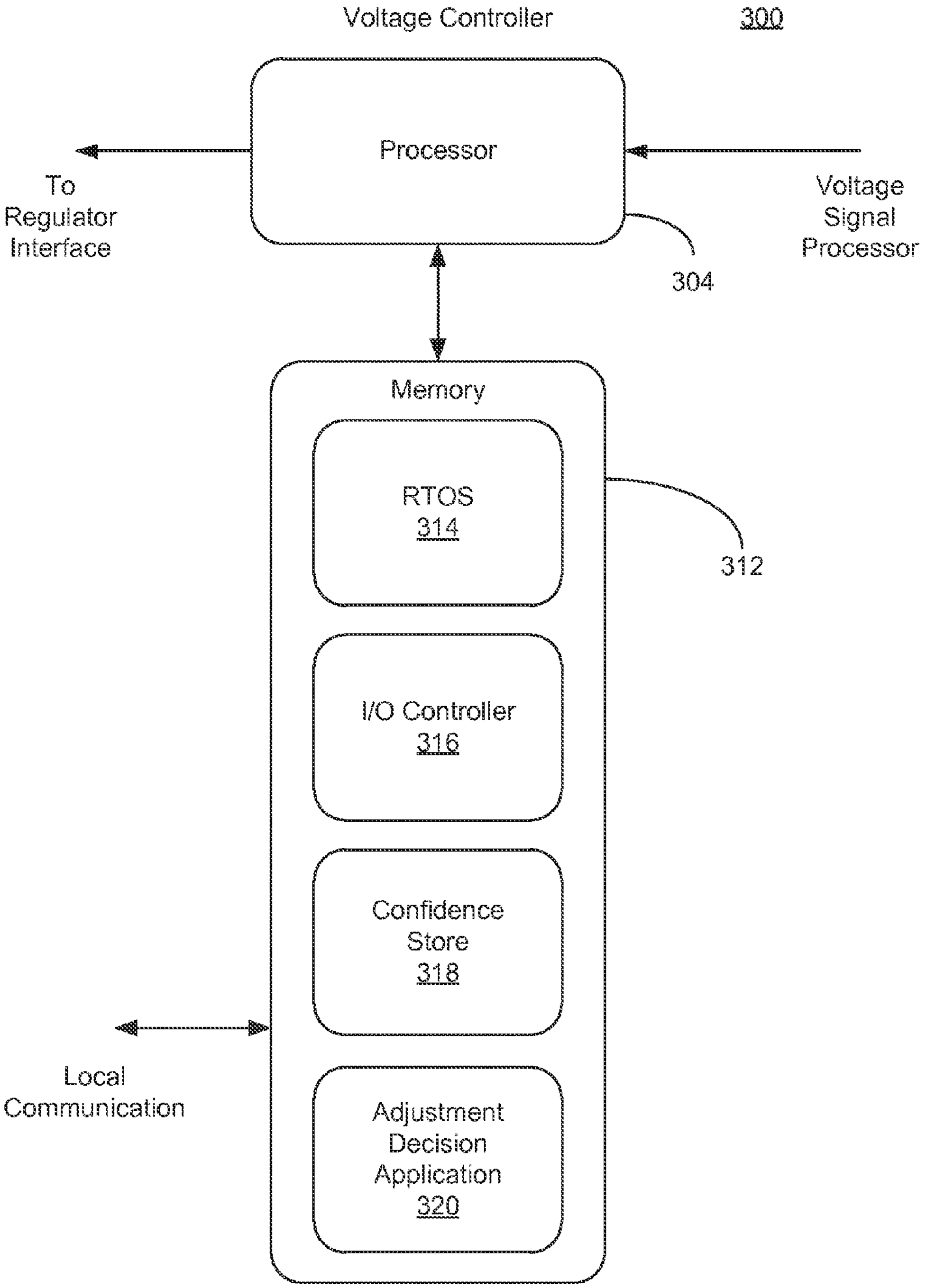
FIG. 3 is an example schematic diagram of a voltage controller shown in FIG. 1, in accordance with an embodiment.
Figure 4:
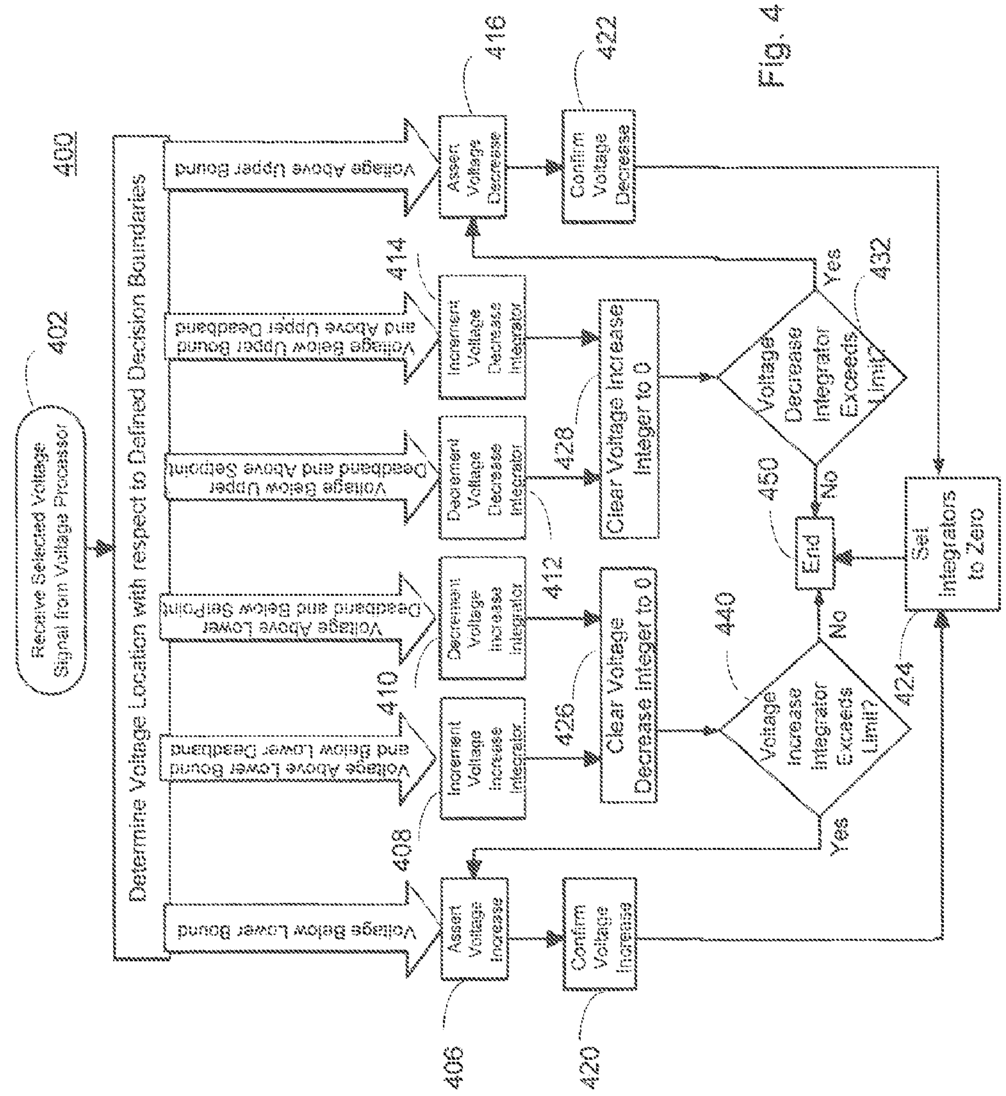
FIG. 4 is an example flow chart of a process for determining a voltage adjustment decision by the voltage controller shown in FIG. 3, in accordance with an embodiment.

In FIG. 3 are illustrated selected modules in Voltage Controller 300 using process 400 shown in FIG. 4. Voltage Controller receives Signals from voltage signal processing circuit 126 and feeds signals to regulator interface 110. Voltage Controller 300 has processing capabilities and memory suitable to store and execute computer-executable instructions. In one example, Voltage Controller 300 includes one or more processors 304 and memory 312.

The memory 322 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 322 of the Voltage Controller 300 may include a real time operating system 314, an I/O controller 316, a confidence store 318, and an adjustment decision application 320. Real time operating system 314 may be used by adjustment decision application 320 to operate controller 300. I/O controller may provide drivers for Voltage controller to communicate with Voltage signal processor or regulator interface. A confidence store 318 may include preconfigured parameters (or set by the user before or after initial operation) such a confidence values, electrical device operating parameters, voltage levels, deadband, setpoint values and probabilities. Such values may be update through an interface with the user directly to the voltage controller (not shown). Details of the adjustment decision application and process are described in FIG. 4.

Illustrated in FIG. 4, is a process 400 for determining a voltage adjustment decision. The exemplary process in FIG. 4 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIG. 4, although it may be implemented in other system architectures.

Figure 5:
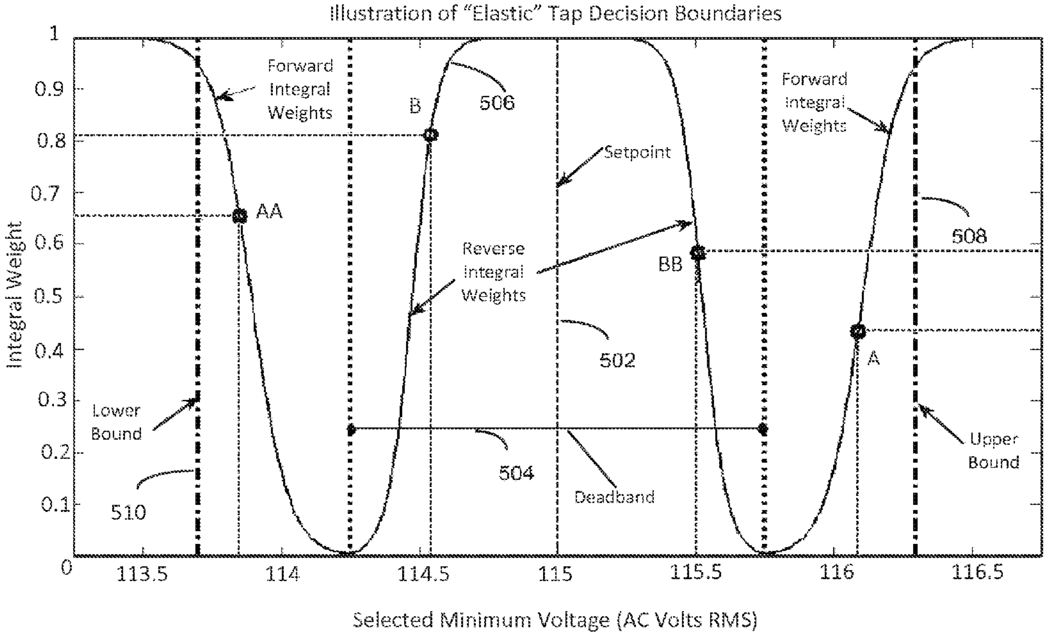
FIG. 5 is an example diagram illustrating an exemplary elastic decision boundaries used by the voltage control system, in accordance with an embodiment.

Referring to FIG. 4, a process 400 is shown for determining a voltage adjustment decision by voltage adjustment decision processor circuit 128 using the processor and modules shown in FIG. 3. In the process, the selected voltage signal is received from the voltage signal processing element 200 (FIG. 2) in block 402. In block 404, a determination is made of the location of the voltage with respect to defined boundary decisions. A graph of exemplary voltage locations and their boundaries is shown in FIG. 5. The decision boundaries were preset based on characteristics of the electrical and electronic devices comprising the loads and confidence levels as discussed herein.

If a determination is made that the received selected voltage is below a lower boundary, an assert voltage increase is executed in block 406. When a voltage increase assertion is executed an increase indication signal is sent to voltage regulating transformer 106 via the regulator interface 110 to increase the tap setting, thereby increasing the delivered voltage.

If a determination is made that the received selected voltage is above the lower bound and below the lower deadband, an increment voltage increase integrator is executed in block 408. If a determination is made that the received selected voltage is above the lower deadband and below the setpoint, a decrement voltage increase integrator is executed in block 410.

If a determination is made that the received selected voltage is below the upper deadband and above the setpoint, a decrement voltage increase integrator is executed in block 412. If a determination is made that the received selected voltage is below the upper bound and above the upper dead band, an increment voltage decrease integrator is executed in block 414.

If a determination is made that the received selected voltage is about the upper bound, an assert voltage decrease is executed in block 416. When an assert voltage decrease is executed a decrease indication signal is sent to voltage regulator transformer via the regulator interface 110 to decrease the tap voltage.

After the assert voltage increase is executed in block 406, a confirm voltage increase is executed in block 420. After the assert voltage decrease is executed in block 416, a confirm voltage decrease is executed in block 422. After executing the confirm voltage increase in block 420 and confirm voltage decrease in block 422, a set all integrators to zero is executed in block 424.

After executing the increment voltage increase integrator in block 408 and the decrement voltage increase integrator in block 410, a set voltage decrease integrator to a zero is executed in block 426. After executing the decrement voltage decrease integrator in block 412 and the increment voltage decrease integrator in block 414, a set voltage increase integrator to a zero is executed in block 428.

After executing set voltage decrease integrator to zero is executed in block 426, a determination is made in block 440 whether the voltage increase integrator exceeds a predetermined limit. If the voltage increase integrator exceeds the predetermined limit, then a voltage increase is asserted in block 406 and confirmed in block 420. If the voltage increase integrator does not exceed the predetermined limit, then the process ends in block 450.

After executing set voltage increase integrator to zero is executed in block 428, a determination is made in block 432 whether the voltage decrease integrator exceeds a predetermined limit. If the voltage increase integrator exceeds the predetermined limit, then a voltage decrease is asserted in block 416 and confirmed in block 422. If the voltage decrease integrator does not exceed the predetermined limit, then the process ends in block 450.

Confirmation of a voltage increase or decrease may be implemented by detecting a step change in one or more voltage(s) measured by corresponding metering device(s) 118*a*-118*n*. An exemplary method for detection of such a step change involves computation of the statistical moments of a voltage time series segment which is expected to manifest a step change, and comparing those moments with those for an ideal step change such as the Heaviside step function. This method of moment matching is described, for example, in a different context by Tabatabai, A. J. and Mitchell, O. R., "Edge Location to Subpixel Values in Digital Imagery", IEEE Transactions on Pattern Analysis and Machine Intelligence Volume PAMI-6, No. 2, pp 188-210, 1984. The magnitude of the step change thus computed may then be compared to that expected by the change in the voltage regulator tap setting to confirm that the voltage change has occurred.

Once the voltages are confirmed in blocks 420 and 422 all integrators are set to zero in block 424 and the process ends in bock 450.

If the voltage decrease integrator does not exceed the predetermined limit, and after setting all integrators to zero in block 448, the process ends in block 450. After ending in block 450 the process may repeat again upon receiving the selected signal from the voltage processor in block 402.

Referring to FIG. 5, there is shown graph 500 illustrating exemplary elastic tap decision boundaries used by the process described in FIG. 4. On the x-axis of graph 500 are the salient voltages and on the y-axis is shown selected integral weights assigned to the voltage regions. A set point voltage 502 is indicated at the center voltage level, and a dead band 504 is assigned at equal voltage displacements from the set point voltage.

An upper bound 508 and lower bound 510 are outside the deadband and are defined based on the predetermined confidence level using the formulas described herein. The forward integration regions are defined as the region between the deadband and the upper bound, or between the deadband and the lower bound. The forward integral weights are applied in these regions. The reverse integration regions are defined as the regions between the dead band and the set point voltage 502.

Exemplary Tap Response to Voltage Changes on Curved Decision Boundaries

In one implementation when the received selected voltage signal from the voltage processor is at a selected minimum voltage at Point 'A', the nonlinear integral associated with a tap decrease decision will be incremented. If the received selected voltage signal remains within the indicated region, eventually a voltage tap decrease will be asserted. Similarly, when the selected minimum voltage appears at Point 'AA', the nonlinear integral associated with a tap increase decision will be incremented, eventually resulting in a voltage tap increase assertion.

On the other hand if when the received selected voltage signal from the voltage processor is at a selected minimum voltage at Point 'B', the nonlinear integral associated with a tap increase decision will be decremented and eventually nullifying the pending tap decision. Similarly, when the selected minimum voltage appears at Point 'BB', the nonlinear integral associated with a tap decrease decision will be decremented, eventually nullifying the pending tap decision.

Dispersion and Variance

For a subject time series obtained by uniform sampling of a random process, comprising sample values:

$$x_k,\ 1 \le k \le n,$$

one may estimate the scale of the sampled time series as either the sample variance or the sample dispersion, depending on the properties of the random process from which the samples are obtained.

First, an estimate of the statistical location, often referred to as the average or mean, is determined, obtained, or otherwise identified. For some non-gaussian random processes, the sample mean does not suffice for this purpose, motivating the use of the median or other robust measures of sample location. In the formulas that follow, we shall designate the location estimate as $\bar{x}$.

A class of non-gaussian random processes is characterized by heavy-tailed probability densities, which are often modeled for analytical purposes as alpha-stable distributions and are thus referred to as alpha-stable random processes. For an exemplary reference on the application of such distributions in signal processing, see: Nikias, C. L. and Shao, M., "Signal Processing with Alpha-Stable Distributions and Applications", John Wiley & Sons, 1995. For time series sampled from non-gaussian alpha-stable random processes, one may estimate the scale as the sample dispersion:

$$d = e^{\frac{1}{n}\sum_{k=1}^{n} \ln|x_k - \bar{x}|}, \text{ for } x_k \ne \bar{x}$$

For time series sampled from gaussian random processes, one may estimate the scale as the sample variance:

$$s = \frac{1}{n-1}\sum_{k=1}^{n}(x_k - \bar{x})^2$$

The choice of the location and scale estimates may be motivated by the properties of the subject random process, which can be determined, for example, by examination of estimates of the probability density of the random process.

Weighting Factors and Integrals Formulas for Use with a Voltage Control Processor The deviation voltage used in the decision boundary integrals is computed as the difference between the selected minimum voltage and the voltage setpoint:

$$\Delta v = v_{min} - v_{set}$$

To determine or compute weighting factors, parameters for the weighting functions can be defined and provided to the voltage controller processor. The following example will use the first-order sigmoid function as the nonlinear weighting function but many others may be applied to achieve different integrating behavior; for example, trigonometric functions, linear or trapezoidal functions, polynomial functions, spine fitting functions, or exponential functions of any order could serve here. In the following definitions, specific subscripts will be used to denote the region of application of the defined quantity.

subscript a shall indicate the region above the setpoint voltage $v_{set}$ subscript b shall indicate the region below the setpoint voltage $v_{set}$ subscript f shall indicate quantities used in the forward (incrementing) integrals subscript r shall indicate quantities used in the reverse (decrementing) integrals Thus, define $v_{af}$, $v_{bf}$ as the inflection points of the sigmoid functions for the weights for the upper (voltage decrease) and lower (voltage increase) forward integrals, respectively.

Similarly, define $v_{ar}$, $v_{br}$ as the inflection points of the sigmoid functions for the weights for the upper (voltage decrease) and lower (voltage increase) reverse integrals, respectively.

Define $2\Delta v_d$ as the magnitude of the voltage deadband, symmetrical around the voltage setpoint. Assigning the quantity β as the slope parameter for the first-order sigmoid and the quantity ω as the voltage corresponding to the location of the inflection point, we can define the nonlinear weighting functions for the four regions of interest:

$$\omega_{af} = [1 + e^{\beta_{af}(v_{af} - v_{min})}]^{-1}$$

$$\omega_{ar} = [1 + e^{\beta_{ar}(v_{min} - v_{ar})}]^{-1}$$

$$\omega_{bf} = [1 + e^{\beta_{bf}(v_{min} - v_{bf})}]^{-1}$$

$$\omega_{br} = [1 + e^{\beta_{br}(v_{br} - v_{min})}]^{-1}$$

The upper voltage adjustment decision integral may now be written as $$\Psi_a = \frac{1}{T_a}\int (\omega_{af}\Delta v\,|_{\Delta v > v_{set} + v_d} - \omega_{ar}\Delta v\,|_{\Delta v < v_{set} + v_d})\,dt$$

and the lower voltage adjustment decision integral as $$\Psi_b = \frac{1}{T_b}\int (\omega_{bf}\Delta v|_{\Delta v<v_{set}+v_d} - \omega_{br}\Delta v|_{\Delta v>v_{set}+v_d})dt$$

The voltage controller then asserts a voltage decrease signal (causing the voltage regulating transformer 106 to tap down) if either $$\Delta v>v_a-v_{set} \text{ or } \Psi_a>v_a-v_{set};$$

in either case, the controller further determines that the 'tap down' operation will not cause the voltage regulating transformer 106 to exceed the lowest tap position permitted by the regulator interface device.

Similarly, the voltage controller then asserts a voltage increase signal (causing the voltage regulating transformer 106 to tap up) if either $$\Delta v<v_b-v_{set} \text{ or } \Psi_b<v_b-v_{set};$$

in either case, the controller further determines that the 'tap up' operation will not cause the voltage regulating transformer 106 to exceed the highest tap position permitted by the regulator interface device.

Referring to FIG. 6, diagram 600 is shown having cumulative probability distribution curve 602 illustrating a typical probability distribution of the voltage control system that is used to select a weighting factor that is used in estimating voltage deviations. The x-axis corresponds to a unit random variable and the y-axis corresponds to a probability. In one implementation a "Tail Probability" 604 or (1-p) is computed using the formula "p=(1-a)/2", where "a" is the specified confidence level and "p" is the tail probability. A "Weighting Factor" 606 is the value of the unit random variable (also generally referred to as "normalized") as located on the Probability Distribution corresponding to the Tail Probability. Although a typical probability distribution is shown, the particular probability distribution that is applied may vary depending on the properties of the electrical load for the electrical or electronic devices.

From the foregoing, it is apparent the description provides systems, processes and apparatus which can be utilized to monitor and manage electrical power distribution. Further, the disclosed systems, processes and apparatus permit power conservation by maintaining delivered voltages near levels that optimize the efficiency of the connected electrical and electronic devices and also can provide more robust power delivery under inclement power system loading conditions. In addition, the systems, processes and apparatus of the present system are cost effective when compared with other power management devices. In contrast to prior art systems, the present systems, processes and apparatus provide infinite variability of system parameters, such as multiple, different delivered voltage levels, within predetermined limits. For example, all users can be incrementally adjusted up or down together, or some users may be adjusted to a first degree while other users are adjusted to another degree or to separate, differing degrees. Such advantageously provides new flexibility in power distribution control, in addition to providing new methods of adjustment.

Line Drop Compensation

In various embodiments, the techniques described above may be used as the basis for improved line drop compensation techniques for use in electricity transmission and distribution circuits.

In typical applications, voltage drops in electricity transmission and distribution circuits may be primarily attributed to loss phenomena in the circuit conductors. For engineering purposes, these phenomena may be quantitatively characterized as resistive and inductive circuit elements, e.g., as typically found in overhead circuit structures. Additionally, capacitive circuit elements may be included, e.g., in cases where insulated conductors are in close mutual proximity as is commonly found in underground circuits. The magnitudes of all such elements are readily calculated if the conductor construction (including materials and geometry) and the conductor arrangement (relative placement) are known. Voltage drops realized in a circuit thus characterized may then be calculated by the application of Ohm's law as formulated for AC circuits. A practice known as Line-Drop Compensation (LDC), in which voltage losses in utility transmission and distribution circuits are estimated consistent with circuit loading, is an example of this procedure.

The objective of this practice is to permit automatic regulation of the circuit voltage at a circuit node distant from the node at which regulating apparatus is available, such that circuit voltages are known to be maintained within prescribed bounds at all nodes of the circuit.

In some cases, the parameter settings for the practice of Line-Drop Compensation (LDC) are calculated exclusively on the basis of electricity transmission and distribution circuit structure and conductor properties. These methods may produce LDC parameters that do not accurately characterize voltage drops in practical transmission and distribution circuits because these methods do not properly account for at least two additional important factors in the construction and operation of such circuits.

First, most such circuits are branching structures, accommodating the geographic distribution of connection sites (customers), with branches having different lengths, different construction details, and different spatial connection densities. Second, while the total circuit load may be known, the loading conditions in each branch of a circuit are typically not known.

The LDC parameter determination techniques described below may overcome these limitations by utilizing additional measurements of distribution circuit performance. In various embodiments, voltages at the circuit nodes are observed (e.g., using any of the remote circuit element monitoring techniques described above) and used to inform the LDC parameter determination. In some embodiments, methods are used that reduce plural remote node voltage observations to a singular effective observation, providing an advantageously simple representation of the distribution circuit.

Figure 7:
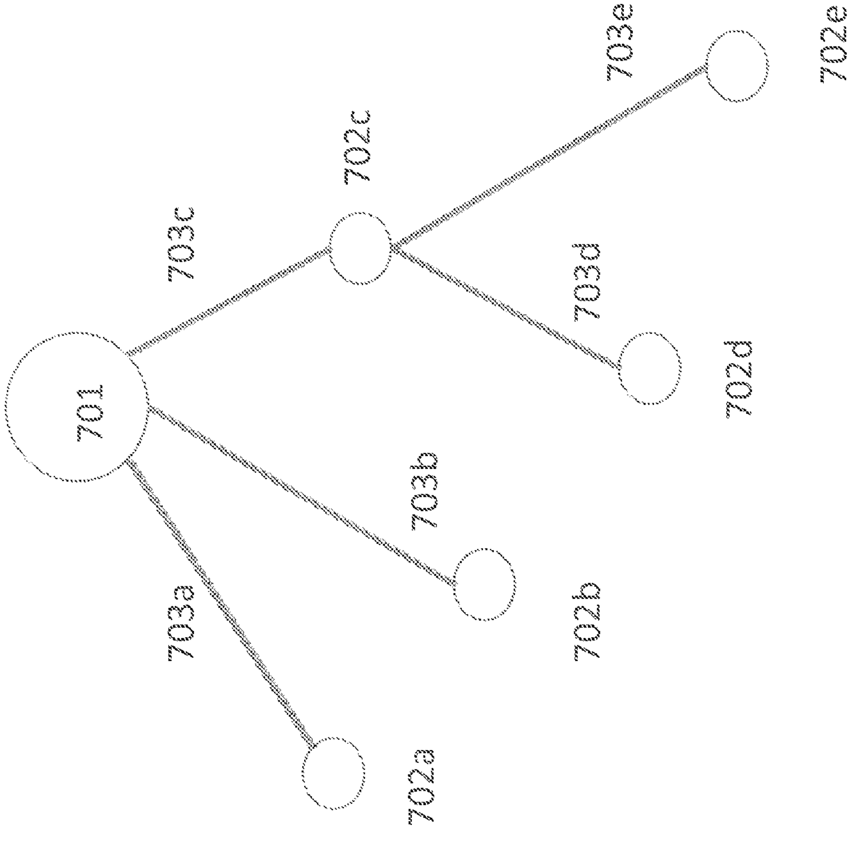
FIG. 7 is an example schematic of a power supply circuit including a regulated voltage source and a plurality of circuit nodes, in accordance with an embodiment.

FIG. 7 shows a schematic representation of a distribution circuit 700. The circuit has a regulated voltage source 701, and is connected to remote nodes 702*a-e* via conductors 703*a-e*. Note that the particular number of nodes, branching structure, conductor lengths, etc. shown are chosen arbitrarily. In various embodiments any other suitable configuration may be used. A voltage regulation device can control a voltage source that supplies electricity to the remote nodes 702*a-e* via the branch structures (e.g., conductors).

The voltage source 701 may be characterized by a voltage phasor $\overline{V}_S$. For convenience, the phasor angle of the source voltage $\overline{V}_S$ is considered to be zero for all times (e.g., all other phasors in the system will have a phasor angle referenced to that of the voltage source). The source 701 has an associated source current $\overline{I}_S$ having a magnitude $I_s$ and a phasor angle $\theta_s$. A voltage regulation device (not shown) is provided at the source to control the source voltage $\overline{V}_S$.

Each node 702 in the system will have an associated primary voltage phasor $\overline{V}_k$ with a magnitude $V_k$ and phasor angle $\theta_k$, where the index k runs over the number of nodes of interest in the circuit. Typically, the voltage at the remote nodes 702 will not be actively regulated.

In general, in the examples below, the sizes, arrangement, and possibly additional information (material properties etc.) of conductors in the circuit will be known.

Figure 8:
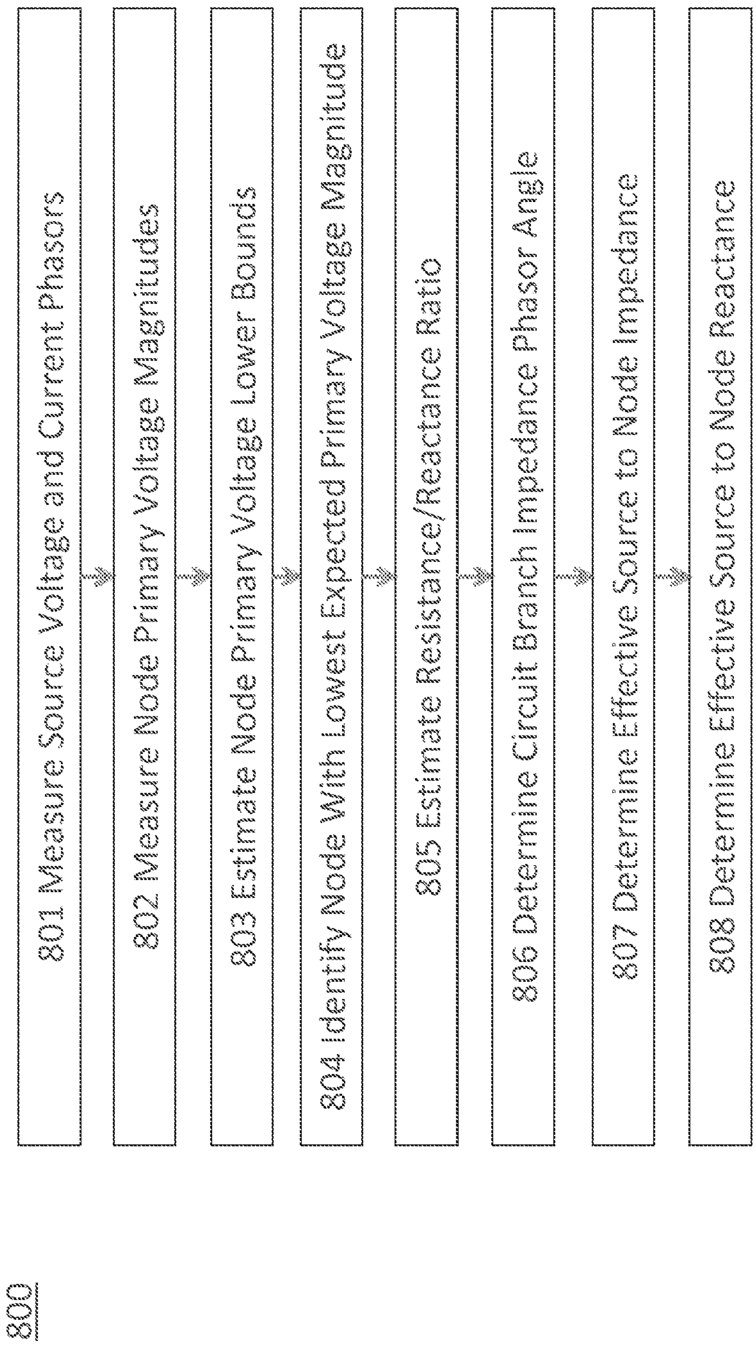
FIG. 8 is an example flow chart of a process for determining line drop compensation parameters for a circuit of the type shown in FIG. 7, in accordance with an embodiment.

FIG. 8 shows an exemplary process flow 800 for a method of determining parameter settings for line drop compensation in a circuit comprising a voltage source having a voltage regulation device and a plurality of remote nodes (e.g., of the type shown in FIG. 7).

In step 801 the source voltage phasor $\overline{V}_S$ and current phasor $\overline{I}_S$ are measured or otherwise determined (e.g., based on inputs to the voltage regulation device). For example, a voltage controller can receive information on voltage and current associated with electricity provided by the voltage source.

In step 802 the magnitude $V_k$ of the primary voltage at each of the remote nodes is measured. For example, a voltage controller can receive the primary voltage from a metering device at each of the nodes. In some embodiments, the phasor angle may not be known for the nodes. In various embodiments, the primary voltage can be measured, obtained, or otherwise identified using any of the remote voltage measurement techniques described herein.

For example, in some embodiments, each nodes of the nodes may include a monitoring device that continuously detects measurements of continuous voltage signals of electricity supplied at the node (e.g., to one or more electrical devices). The monitoring devices are may be coupled through communications media to a processor implementing the described LDC method. The processor may include a voltage signal processing module that receives sampled signals from the monitoring devices. The monitoring devices process and sample the continuous voltage signals such that the sampled voltage signals are uniformly sampled as a time series that are free of spectral aliases. Such metering devices having this process and sample capability are generally commercially available. For example, in some embodiments, the monitoring device may include one or more "smart meters" incorporated in an automated metering infrastructure system.

In step 803, the nodal voltages are processed to determine an estimated lower bound $\hat{V}_k$ of the voltage of each node during circuit use. In various embodiments, this lower bound may be estimated using any of the techniques described above. For example, in some embodiments, estimating the lower bound includes, for each node, continuously detecting measurements of electricity supplied to the node from the source. This information may be used to continuously compute estimated deviant voltage levels that the supplied electricity will not drop below as a result of varying electrical consumption at the node. As detailed above, the deviant voltage level may be computed based on a predetermined confidence level and the detected measurements.

For example, in some embodiments, a processor is used to continuously compute estimated deviant voltage levels that the supplied electricity will not drop below or exceed as a result of varying electrical consumption by the one or more electrical devices powered by the nodes. The deviant voltage levels are computed based on a predetermined confidence level and the detected measurements (as explained in more detailed herein). The processor may include a voltage signal processing module that receives sampled signals from the monitoring devices. As noted above, the monitoring devices process and sample the continuous voltage signals such that the sampled voltage signals are uniformly sampled as a time series that are free of spectral aliases.

The voltage signal processing module receives signals via the communications media from the monitoring devices and processes the signals and feeds them to further processing module. This module may compute a deviant voltage level (e.g., of the type that may be used to adjust the voltage level output of electricity supplied to the electrical device using the techniques described above).

In some embodiments, the voltage signals may be processed using a voltage signal processing element of the type shown in FIG. 2 above. Referring back to FIG. 2, voltage signal processing element 200 is shown having processing elements 202*a*-202*n* coupled to minimum selector circuit 204. Each of the processing elements 202*a*-202*n* receives on their respective input terminals a measured voltage signal from a respective monitoring device. Processing elements 202*a*-202*n* processes the measured signal (as described herein) and generates a processed voltage signal on their output terminals 206*a*-206*n* respectively. Minimum selector circuit 204 selects the processed voltage signal having the minimum voltage and outputs the selected signal for further processing (as detailed below).

Processing elements 202*a*-202*n* can be identical and thus only one element, 202*a* will be described. In some embodiments, processing element 202*a* includes three parallel processing paths that are coupled to summation circuit 210. Each of the processing elements receives sampled time series signals from one of the monitoring devices. In the first path, a low pass filter circuit 212 receives the measured voltage signal, applies a low pass filter to the signal and feeds the low pass filtered signal to compensate circuit 214 where the signal or an estimate of the signal is extrapolated in time such that the delay resulting from the low pass filtering operation is removed and then fed to summation circuit 210.

In the second path, a linear detrend circuit 220 receives the measured voltage signal, and removes any linear trends from the signal. The resulting signal, having zero mean and being devoid of any change in its average value over its duration, is then applied to dispersion circuit 222 where a zero mean dispersion is estimated for the signal. The zero mean dispersion estimated signal is fed to low pass filter circuit 224 that applies a low pass filter to the signal. The filtered signal is then fed to delay compensation circuit 226 where the filtered signal or an estimate of the filtered signal is extrapolated in time such that the delay resulting from the low pass filtering operation is removed. A weighting factor 606 is shown in FIG. 6 and is described in connection therewith. Weighting factor 606 is derived from a specified confidence level as described herein and is applied to the signal output from element 226 before being fed as a delay compensated signal to summation circuit 210.

In the third path, a band pass filter circuit 230 receives the measured voltage signal, and applies a band pass filter to the signal. The filtered signal is then applied to an envelope circuit 232 where the signal is formed into a peak envelope with specified peak decay characteristics. The peak envelope signal is fed to low pass filter circuit 234 that applies a low pass filter to the signal to provide a filtered smooth peak envelope voltage signal, and feeds the signal to delay compensation circuit 236 where the filtered smooth peak envelope voltage signal or an estimate thereof is extrapolated in time such that the delay resulting from the low pass filtering operation is removed before being fed to as a delay compensated signal to summation circuit 210.

In some embodiments, the above described processing approach, or other suitable method, may thus be used to generate lower bound information indicative of the expected lower bound $\hat{V}_k$ of the voltage provided by each node.

In step 804, the lower bound information for the nodes can be used to identify a node having the lowest expected voltage level $\hat{V}_L=\min(\hat{V}_k)$. For example, the voltage controller can select a node out of the several nodes based, at least in part, on the primary voltage information.

In step 805, known information about the circuit conductors (size, arrangement, material properties, etc.) are used to estimate the ratio $\gamma_L=x_L/r_L$ of reactance to ohmic resistance per unit length for a circuit branch structure corresponding to the node having lowest expected primary voltage $\hat{V}_L$ (referred to henceforth as the "subject node"). The magnitude of the effective circuit impedance phasor $\bar{z}_L$ to the subject node is related to the effective resistance $r_L$ by $z_L=r_L(1+j\gamma_L)$. The phasor angle associate with $\bar{z}_L$ is referred to as $\theta_z$.

In step 805, the ratio determined in step 804 is used to determine the circuit branch impendence phasor angle $\theta_z=\tan^{-1}\gamma_L$. For example, the voltage controller can determine the impedance for a branch structure corresponding to the selected node based on one or more properties associated with the branch structure, such as a circuit conductor's size, branch arrangement, material properties, etc.

In step 806, and in some embodiments, an effective resistance from the source to the subject node can be determined based on the source voltage information, the source current information, and the impedance information (e.g., circuit branch impedance phasor angle). In some embodiments, determining the effective resistance can include determining a difference between a magnitude of a voltage of the voltage source and a primary voltage of the selected node; and taking a quotient of the difference and the magnitude of a source current phasor of the voltage source. For example, and in some embodiments, the effective resistance $r_L$ may be determined based on the expression:

$$r_L=\frac{V_s-\hat{V}_L\cos(\theta_s+\theta_z)}{I_s\cos(\theta_s+\theta_z)}.$$

In step 807, and in some embodiments, an effective reactance from the source to the subject node can be determined based on the effective resistance information and the circuit branch impedance information. For example, in some embodiments, the effective reactance is calculated as $x_L=r_L\gamma_L$.

This effective resistance and reactance information may be output, e.g., for use as input parameters for any suitable LDC technique. In some embodiments, this technique may be implemented used the voltage regulation device associated with the source voltage. For example, the voltage controller can control the voltage regulation device based on the impedance for the branch structure corresponding to the selected node and the information on the voltage and the current associated with the electricity provided by the voltage source (e.g., the source voltage phasor $\bar{V}_S$ and current phasor $\bar{I}_S$).

Figure 9:
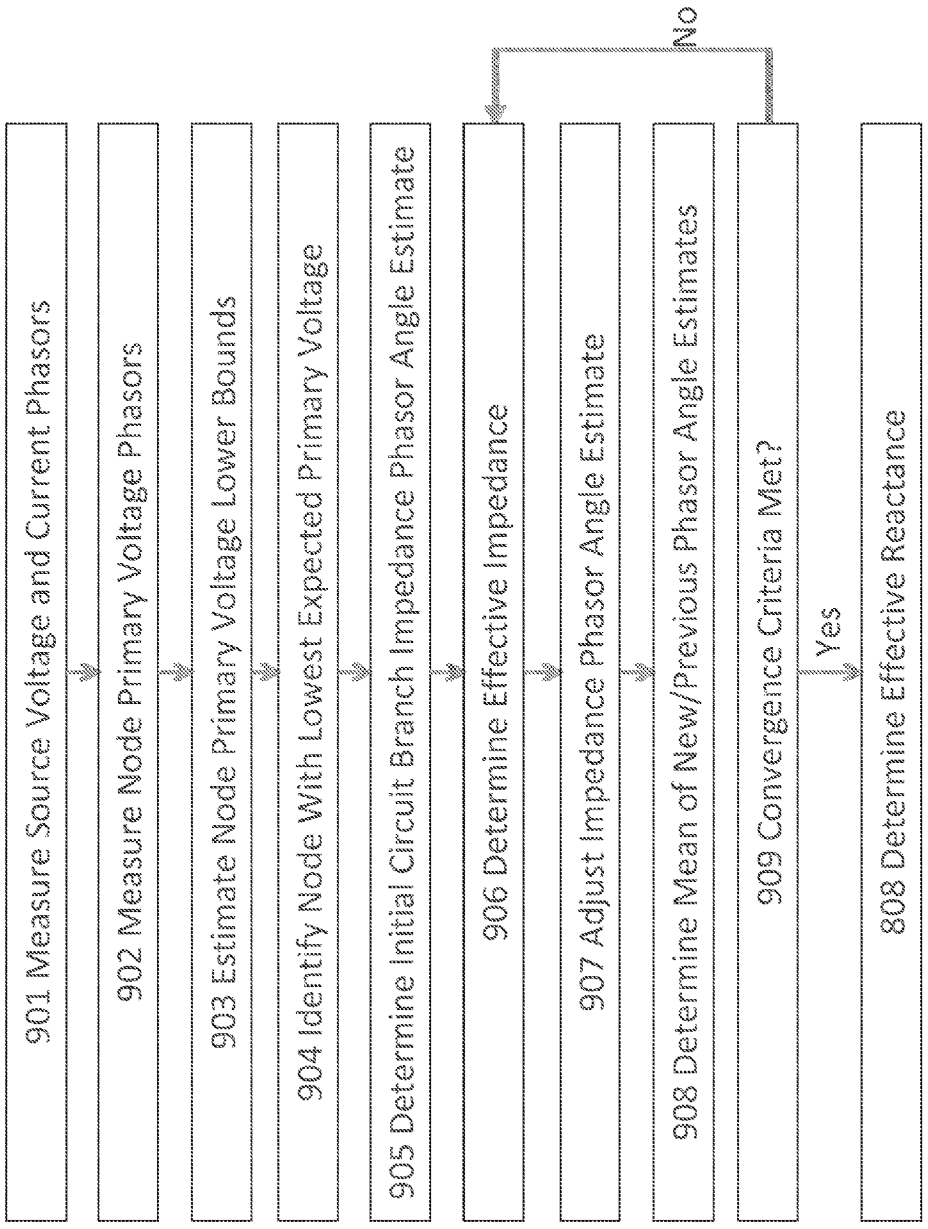
FIG. 9 is an example flow chart of a process for determining line drop compensation parameters for a circuit of the type shown in FIG. 7, in accordance with an embodiment.

FIG. 9 shows an exemplary process flow 900 for another method of determining parameter settings for line drop compensation in a circuit comprising a voltage source having a voltage regulation device and a plurality of remote nodes (e.g., of the type shown in FIG. 7).

In step 901 the source voltage phasor $\bar{V}_S$ and current phasor $\bar{I}_S$ are measured or otherwise determined (e.g., based on inputs to the voltage regulation device).

In step 902 the voltage phasor $\bar{V}_k$ of the primary voltage at each of the remote nodes is measured, for example, using any of the remote voltage measurement techniques described above (e.g., as described with respect to method step 802 above). In contrast to the example described in reference to FIG. 8, in the current embodiment both the magnitude $V_k$ and the associated phasor angle $\theta_k$ is measured for each of the nodes.

In step 903, the nodal voltages are processed to determine an estimated lower bound $\hat{V}_k$ of the voltage of each node during circuit use. In various embodiments, this lower bound may be estimated using any of the techniques described above (e.g., as described with respect to method step 803 above). For example, in some embodiments, estimating the lower bound includes, for each node, detecting measurements of electricity supplied to the node from the source. The measurements may be detected continuously, periodically, in real-time. The measurement data may be received continuously, periodically, in real-time, in a batch process, or some other time interval or responsive to an event or condition. This information may be used to compute estimated deviant voltage levels (e.g., continuously compute, periodically, or based on another time interval) that the supplied electricity will not drop below as a result of varying electrical consumption at the node. As detailed above, the deviant voltage level may be computed based on a predetermined confidence level and the detected measurements.

In step 904, the lower bound information for the nodes is used to identify a node having the lowest expected voltage level $\hat{V}_L=\min(\hat{V}_k)$.

In step 905, known information about the circuit conductors (size, arrangement, material properties, etc.) are used to provide an initial estimate the ratio $\gamma_L=x_L/r_L$ of reactance to ohmic resistance per unit length for a circuit branch structure corresponding to the node having lowest expected primary voltage $\hat{V}_L$ (referred to henceforth as the "subject node"). The magnitude of the effective circuit impedance phasor $\bar{V}_L$ to the subject node is related to the effective resistance $r_L$ by $z_L=r_L(1+j\gamma_L)$. The phasor angle associate with $\bar{z}_L$ is referred to as $\theta_z$.

In step 905, the ratio determined in step 804 is used to determine the circuit branch impendence phasor angle $\theta_z=\tan^{-1}\gamma_L$.

In steps 906-909, the effective resistance from the source to the subject node is determined based an iterative process that refines the estimate for the branch impendence phasor angle $\theta_z=\tan^{-1}\gamma_L$, subject to a convergence criteria. For example, in some embodiments, in step 906 the effective resistance is estimated based on the expression:

$$r_L=\frac{V_s-\hat{V}_L\cos(\theta_s+\theta_z)}{I_s\cos(\theta_s+\theta_z)},$$

where $\theta_z$ is a current estimate of the circuit branch impedance phasor angle. During the first iteration, $\theta_z$ will be the initial estimate determined in step 905. In step 907, a new adjusted impedance phasor angle estimate is calculate as $$\theta_z=\sin^{-1}\left(\frac{-V_L\sin(\theta_L)}{I_S r_L}\right)-\theta_S$$

where $V_L$ is the magnitude of the voltage phasor for the node having the lowest expected primary voltage, $\theta_L$ is the phasor angle of the voltage phasor for the subject node having the lowest expected primary voltage.

In step 908, the mean of the new and previous estimate of the circuit branch impedance phasor angle is calculated and, in some embodiments, may be used as the estimate in the next iteration.

In step 909 the new and previous estimates of the circuit branch impedance phasor angle are compared. If this comparison meets a convergence criterion (e.g., if the values differ by less than a threshold amount), the iteration ends. If not, steps 906-909 are repeated.

In step 910, the effective reactance from the source to the subject node is determined based on the effective resistance information and the circuit branch impedance information. For example, in some embodiments, the effective reactance is calculated as $x_L = r_L \tan(\theta_z)$.

This effective resistance and reactance information may be output, e.g., for use as input parameters for any suitable LDC technique. In some embodiments, this technique may be implemented used the voltage regulation device associated with the source voltage.

While two examples of LDC processing are disclosed above, it is to be understood that, in various embodiments, other techniques or processing schemes may be used. In general, as in the specific examples above, these methods will be applied to a power distribution circuit featuring a primary source and plurality of remote nodes. In typical embodiments, properties (e.g., sizes, material properties, and arrangements) of conductors in the circuit will be known, and the performance of the source and the plural remote nodes will be observed (e.g. to provide information indicative of the source voltage, source current, and the remote node voltages). This information is then processed to reduce a plurality of observations for the plurality of remote nodes to a single effective observation. An effective property (e.g., effective reactance) from the source to any given node may then be determined based on the effective observation, and the known properties of the conductors along the corresponding circuit branch. This effective property may then be used as an input parameter for any suitable LDC technique known in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the present disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above.

Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, e.g., elements that are conjunctively present in some cases and disjunctively present in other cases. Multiple elements listed with "and/or" should be construed in the same fashion, e.g., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, e.g., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (e.g. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, e.g., including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While the above detailed description has shown, described and identified several novel features of the disclosure as applied to a preferred embodiment, it will be understood that various omissions, substitutions and changes in the form and details of the described embodiments may be made by those skilled in the art without departing from the spirit of the disclosure. Accordingly, the scope of the disclosure should not be limited to the foregoing discussion, but should be defined by the appended claims.

What is claimed is:

1. A method of regulating electric power at a node of a system for distribution of electricity, comprising:

identifying, by a voltage controller, one or more properties of branch structures in the system, the system comprising a voltage regulation device that controls a voltage source that supplies electricity to a plurality of nodes via the branch structures;

receiving, by the voltage controller, information on voltage and current associated with electricity provided by the voltage source;

receiving, by the voltage controller from a metering device at each of the plurality of nodes in the system, primary voltage information;

selecting, by the voltage controller, a node of the plurality of nodes based on the primary voltage information;

determining, by the voltage controller based on the one or more properties, an impedance for a branch structure corresponding to the selected node; and controlling, by the voltage controller, the voltage regulation device based on the impedance for the branch structure corresponding to the selected node and the information on the voltage and the current.

2. The method of claim 1, further comprising:

determining an effective resistance from the voltage source to the selected node based on the impedance and the information on the voltage and the current; and controlling, by the voltage controller, the voltage regulation device based on the effective resistance.

3. The method of claim 1, further comprising:

determining an effective resistance from the voltage source to the selected node based on the impedance and the information on the voltage and the current;

determining an effective reactance from the voltage source to the selected node based on the effective resistance and the impedance; and controlling, by the voltage controller, the voltage regulation device based on the effective resistance and the effective reactance.

4. The method of claim 1, further comprising:

determining a difference between a magnitude of a voltage of the voltage source and a primary voltage of the selected node;

determining an effective resistance based on a quotient of the difference and a magnitude of a source current phasor of the voltage source; and controlling, by the voltage controller, the voltage regulation device based on the effective resistance.

5. The method of claim 1, further comprising:

determining an effective resistance from the voltage source to the selected node based on the impedance and the information on the voltage and the current;

determining an effective reactance from the voltage source to the selected node based on a product of the effective resistance and the impedance; and controlling, by the voltage controller, the voltage regulation device based on the effective resistance and the effective reactance.

6. The method of claim 1, wherein the one or more properties are indicative of at least one of a size of the branch structures, a material of the branch structures, or an arrangement of the branch structures.

7. The method of claim 1, wherein the information on voltage and current comprises a source current phasor of the voltage source.

8. The method of claim 1, further comprising:

determining a lower bound for each primary voltage of the plurality of nodes; and selecting the node having a lowest primary voltage based on the lower bound.

9. The method of claim 1, further comprising:

detecting measurements of electricity supplied to each node of the plurality of nodes from the voltage source;

determining deviant voltage levels that the supplied electricity will not drop below as a result of varying electrical consumption at the node, the deviant voltage level being computed based on a confidence level and the detected measurements;

determining a lower bound for each primary voltage of the plurality of nodes based on the determined deviant voltage levels; and selecting the node having a lowest primary voltage based on the lower bound for each primary voltage of the plurality of nodes.

10. The method of claim 9, further comprising:

detecting measurements of the supplied electricity to each node of the plurality of nodes by compensating for one or more delays in a signal path of the detected measurements.

11. The method of claim 9, further comprising:

detecting measurements of the supplied electricity to each node of the plurality of nodes by processing a voltage time series of the supplied electricity along multiple signal paths to produce a delay compensated smoothed negative peak envelope of the voltage time series.

12. The method of claim 1, further comprising:

controlling, by the voltage controller, the voltage regulation device by providing line drop compensation.

13. A system for regulating electric power at a node of electric power distribution circuitry, comprising:

a computing device including at least one processor configured to:

identify one or more properties of branch structures distribution circuitry comprising a voltage regulation device that controls a voltage source supplying electricity to a plurality of nodes via the branch structures;

receive information on voltage and current associated with electricity provided by the voltage source;

receive, from a metering device at each of the plurality of nodes in the system, primary voltage information;

select a node of the plurality of nodes based on the primary voltage information;

determine, based on the one or more properties, an impedance for a branch structure corresponding to the selected node; and control the voltage regulation device based on the impedance for the branch structure corresponding to the selected node and the information on the voltage and the current.

14. The system of claim 13, wherein the at least one processor is further configured to:

determine an effective resistance from the voltage source to the selected node based on the impedance and the information on the voltage and the current; and control the voltage regulation device based on the effective resistance.

15. The system of claim 13, wherein the at least one processor is further configured to:

determine an effective resistance from the voltage source to the selected node based on the impedance and the information on the voltage and the current;

determine an effective reactance from the voltage source to the selected node based on the effective resistance and the impedance; and control the voltage regulation device based on the effective resistance and the effective reactance.

16. The system of claim 13, wherein the at least one processor is further configured to:

determine a difference between a magnitude of a voltage of the voltage source and a primary voltage of the selected node;

determine an effective resistance based on a quotient of the difference and a magnitude of a source current phasor of the voltage source; and control the voltage regulation device based on the effective resistance.

17. The system of claim 13, wherein the at least one processor is further configured to:

determine an effective resistance from the voltage source to the selected node based on the impedance and the information on the voltage and the current;

determine an effective reactance from the voltage source to the selected node based on a product of the effective resistance and the impedance; and control the voltage regulation device based on the effective resistance and the effective reactance.

18. The system of claim 13, wherein the one or more properties are indicative of at least one of a size of the branch structures, a material of the branch structures, or an arrangement of the branch structures.

19. The system of claim 13, wherein the information on voltage and current comprises a source current phasor of the voltage source.

20. The system of claim 13, wherein the at least one processor is further configured to:

detect measurements of electricity supplied to each node of the plurality of nodes from the voltage source;

determine deviant voltage levels that the supplied electricity will not drop below as a result of varying electrical consumption at the node, the deviant voltage level being computed based on a confidence level and the detected measurements;

determine a lower bound for each primary voltage of the plurality of nodes based on the determined deviant voltage levels; and select the node having a lowest primary voltage based on the lower bound for each primary voltage of the plurality of nodes.

* * * * *